United States Patent
Ericson et al.

(10) Patent No.: US 9,756,482 B2
(45) Date of Patent: Sep. 5, 2017

(54) SELECTIVE USE OF SINGLE-LINK COMMUNICATION AND GROUP COMMUNICATION

(71) Applicant: TELEFONAKTIEBOLAGET L M ERICSSON (PUBL), Stockholm (SE)

(72) Inventors: Mårten Ericson, Luleå (SE); Stefan Wänstedt, Luleå (SE); Min Wang, Luleå (SE); Jan Christoffersson, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/620,655

(22) Filed: Feb. 12, 2015

(65) Prior Publication Data

US 2016/0242011 A1  Aug. 18, 2016

(51) Int. Cl.
 *H04B 7/00* (2006.01)
 *H04W 4/08* (2009.01)
 *H04W 76/02* (2009.01)
 *H04L 29/08* (2006.01)
 *H04W 76/00* (2009.01)

(52) U.S. Cl.
 CPC ........... *H04W 4/08* (2013.01); *H04L 67/1044* (2013.01); *H04W 76/002* (2013.01); *H04W 76/023* (2013.01)

(58) Field of Classification Search
 USPC ......... 455/517–520, 41.1–41.3, 550.1, 552.1
 See application file for complete search history.

(56) References Cited

U.S. PATENT DOCUMENTS

| | | | |
|---|---|---|---|
| 6,904,110 B2* | 6/2005 | Trans | H04B 1/00 375/229 |
| 8,948,770 B2* | 2/2015 | Du | H04W 76/043 455/443 |
| 2009/0111456 A1* | 4/2009 | Shaffer | H04W 36/30 455/422.1 |
| 2011/0032832 A1 | 2/2011 | Jalali | |
| 2013/0029680 A1 | 1/2013 | Park | |
| 2014/0179330 A1* | 6/2014 | Du | H04W 76/043 455/450 |

FOREIGN PATENT DOCUMENTS

| | | |
|---|---|---|
| EP | 2584757 A1 | 4/2013 |
| WO | 2011/005708 A1 | 1/2011 |

OTHER PUBLICATIONS

3GPP TR 22.803 V12.2.0; 3rd Generation Partnership Project; Technical Specification Group Services and System Aspects; Feasibility study for Proximity Services (ProSe) (Release 12); Jun. 2013.

(Continued)

*Primary Examiner* — Fayyaz Alam (57) ABSTRACT

A method of controlling a communication mode of a device in a wireless communication network comprises determining a group communication performance for a group communication mode of the device, determining a single-link communication performance for a single-link communication mode of the device, comparing the group communication performance with the single-link communication performance, and controlling the device to operate in the group communication mode or the single-link communication mode based on the comparison.

32 Claims, 10 Drawing Sheets

(56) References Cited

OTHER PUBLICATIONS

Elmenreich, W., et al., "Building Blocks of Cooperative Relaying in Wireless Systems," Lakeside Labs, Institute of Networked and Embedded Systems, Univ. of Klagenfurt, Aug. 14, 2008.

Dohler, Mischa, "Virtual Antenna Arrays," Dept of Electrical and Electronic Engineering, King's College London, Univ of London, Nov. 2003.

* cited by examiner

SELECTIVE USE OF SINGLE-LINK COMMUNICATION AND GROUP COMMUNICATION

TECHNICAL FIELD

The disclosed subject matter relates generally to telecommunications, and more particularly to the selective use of single-link communication and group communication in a communication network using device-to-device communication.

BACKGROUND

Device-to-device (D2D) communication is a type of radio communication in which devices communicate directly with each other, without routing data through the network infrastructure. D2D communication is currently envisioned as a way to expand the capability of existing communication networks, e.g., by providing proximity based services, public safety services, or enhanced bandwidth and/or quality services.

One way to provide enhanced bandwidth and/or quality services with D2D communication is through the use of so-called "group communication", examples of which are disclosed in International Patent No. PCT/SE2014/050484 filed Apr. 23, 2014 and entitled "Method of Transmitting Data". In group communication, data from a source device is transmitted to a network node by a process in which the source device shares the information with other nearby devices belonging to the group using D2D communication, and then the devices in the group concurrently transmit the shared data to the network node. In other words, the devices in the group concurrently transmit the same data to the network node, effectively increasing the overall power with which the data is transmitted.

Figure 1:
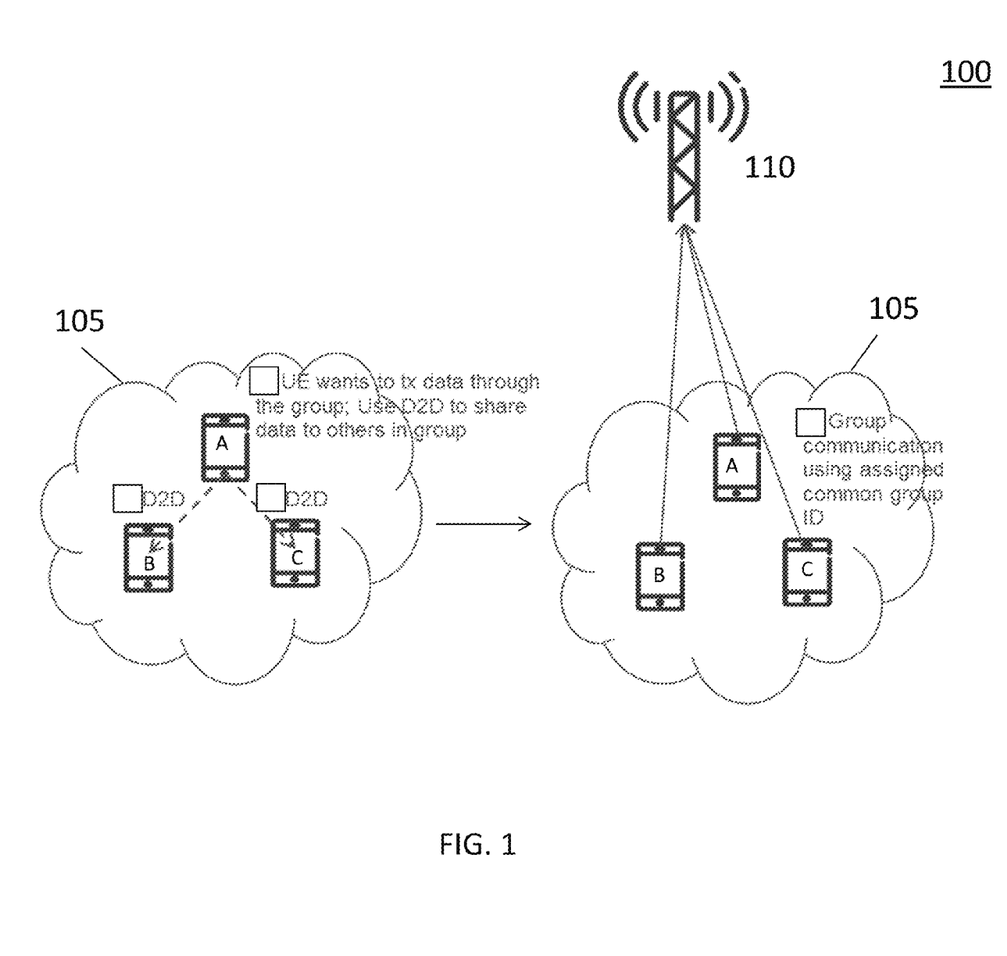
FIG. 1 is a diagram illustrating a communication network that employs group communication.

FIG. 1 is a diagram illustrating a communication network 100 that employs group communication. As illustrated in FIG. 1, communication network 100 comprises a group 105 of devices, and a network node 110. Group 105 comprises devices A, B and C, which may be, for instance, user equipment (UE) in a Long Term Evolution (LTE) network.

The formation of group 105 typically requires some sort of user action or an automated decision procedure, which could be performed during operation of network or during initial network configuration, for example. Such action or procedure may occur at one or more of devices A, B or C, or it may occur elsewhere in communication network 100. Once a decision has been made to form group 105, one or more of devices A, B and C, or some other device, may send a request to communication network 100 for a group identifier (ID). Communication network 100 may then provide the group ID to the devices for use in group communication.

In the example shown in FIG. 1, device A uses group communication to transmit data to network node 110. In a first step shown on the left side of FIG. 1, device A transmits the data to devices B and C using D2D communication, as indicated by dotted arrows. It also sends time information that can be used by devices A, B and C to transmit the data in a synchronized manner. For instance, the time information may be a time instant when the data shall be sent by each of the devices to network node 110.

Thereafter, in a second step shown on the right side of FIG. 1, devices A, B and C transmit the data to network node 110 in the synchronized manner, as indicated by solid arrows. Typically, this means that they transmit the information at the same time, in accordance with the time information.

Network node 110 generally transmits downlink (DL) data to group 105 as if the group were a single device, e.g., a single UE. Typically, at least one device in group 105 is designated to receive the DL data and then relay the DL data to the other devices in the group via D2D communication.

The devices in group 105 share a set of group resources, which generally means that only one of the devices can transmit its own data at each time instant. Accordingly, if several devices have data to transmit, they may be required to alternate using the group resources, e.g., in a round robin fashion. The alternating use of group resources tends to delay transmissions. The negative impact of such delays, in some circumstances, may outweigh the benefits of using group communication.

SUMMARY

In one embodiment of the disclosed subject matter, method of controlling a communication mode of a device in a wireless communication network comprises determining a group communication performance for a group communication mode of the device, determining a single-link communication performance for a single-link communication mode of the device, comparing the group communication performance with the single-link communication performance, and controlling the device to operate in the group communication mode or the single-link communication mode based on the comparison.

In some related embodiments, the device comprises UE, and the method is performed by a network node in the wireless communication network. In some other related embodiments, the device comprises UE in the wireless communication network, and the method is performed by the UE.

In some related embodiments, determining the group communication performance comprises determining a user bit rate at which data can be transferred from the device to a network node using the group communication mode. In such embodiments, determining the user bit rate may comprise, for example, determining a maximum user bit rate that can be achieved by the device when performing group communication to transmit information using the radio links to the network node provided by other devices in a corresponding group, determining a number of the other devices that are currently active in group communication, and determining the user bit rate based on the maximum user bit rate and the number of the other devices in the corresponding group. Moreover, determining the maximum user bit rate may comprise, for example, determining a sum of respective gain values for devices in the corresponding group, the sum reflecting the quality of a radio connection between the device and the network node, and applying a function to the determined sum to produce an estimate of the maximum bit rate. The function can be, e.g., a log function or a look-up-table function. The respective gain values may be, e.g., signal to interference plus noise ratio (SINR) values. Additionally, determining the user bit rate may comprise, for instance, reading information from a group communication queue, determining a number of devices in a group that are currently active in group communication based on the information, and determining the user bit rate based on the determined number of devices.

In some related embodiments, determining the single-link communication performance comprises determining a user bit rate at which data can be transferred from the device to a network node using the single-link communication mode.

In some related embodiments, the group communication performance comprises a user bit rate associated with the group communication mode, the single-link communication performance comprises a user bit rate associated with the single-link communication mode, and comparing the group communication performance with the single-link communication performance comprises determining whether the user bit rate associated with the group communication mode is greater than the user bit rate associated with the single-link communication mode. In such embodiments, the method may further comprise controlling the device to operate in the group communication mode as a consequence of determining that the user bit rate associated with the group communication mode is greater than the user bit rate associated with the single-link communication mode.

In some related embodiments, the method further comprises receiving information exchanged between devices in a group designated to jointly use the group communication mode, and determining the group communication performance based on the received information. The received information may comprise, for instance, a gain from the devices to a network node, which reflects the channel quality of a radio link between the device and network node. Alternatively, it may comprise an activity value indicating availability of device resources for group communication. Such an activity value may indicate whether one or more devices in the group are currently operating in single-link communication mode, or it may indicate an expected time that each of multiple devices in the group is to use group communication.

In some related embodiments, the method further comprises defining a minimum group communication usage or maximum single-link communication usage, and controlling each of multiple devices in a group jointly using the group communication mode to perform group communication or single-link communication in accordance with the defined minimum group communication usage or maximum single-link communication usage.

In some related embodiments, the group communication performance comprises a user bit rate associated with the group communication mode, the single-link communication performance comprises a user bit rate associated with the single-link communication mode, and comparing the group communication performance with the single-link communication performance comprises determining whether the user bit rate associated with the group communication mode is greater than the user bit rate associated with the single-link communication mode plus a margin if the communication between the devices and the group communication to the network use same frequency.

In another embodiment of the disclosed subject matter, an apparatus is configured to control a communication mode of a device in a wireless communication network. The apparatus comprises a first performance determination module configured to determine a group communication performance for a group communication mode of the device, a second performance determination module configured to determine a single-link communication performance for a single-link communication mode of the device, a comparison module configured to compare the group communication performance with the single-link communication performance, and a control module configured to control the device to operate in the group communication mode or the single-link communication mode based on the comparison.

In some related embodiments, the first and second performance determination modules, the comparison module, and the control module reside in a network node of the wireless communication network. In some alternative embodiments, the first and second performance determination modules, the comparison module, and the control module reside in UE of the wireless communication network.

In some related embodiments, the group communication performance is defined in relation to a user bit rate at which data can be transferred from the device to a network node using the group communication mode. The user bit rate may be defined in relation to a maximum user bit rate that can be achieved by the device when performing group communication through other devices in a corresponding group, and a number of the other devices that are currently active in group communication. Moreover, the maximum user bit rate may be defined in relation to a sum of respective gain values for devices in the corresponding group, and the respective gain values may be SINR values.

In some related embodiments, the first performance determination module is configured to determine the user bit rate by reading information from a group communication queue, determining a number of devices in a group that are currently active in group communication based on the information, and determining the user bit rate based on the determined number of devices.

In some related embodiments, the group communication performance comprises a user bit rate associated with the group communication mode, the single-link communication performance comprises a user bit rate associated with the single-link communication mode, and the comparison unit is configured to determine whether the user bit rate associated with the group communication mode is greater than the user bit rate associated with the single-link communication mode.

In some related embodiments, the apparatus further comprises a receiving unit configured to receive information transmitted from devices in a group designated to jointly use the group communication mode, wherein the first performance determination unit is configured to determine the group communication performance based on the received information. The received information may comprise, for instance, a gain from the devices to a network node, a gain between the devices in the group, or an activity value indicating availability of device resources for group communication.

In yet another embodiment of the disclosed subject matter, a computer readable medium stores instructions for performing a method of controlling a communication mode of a device in a wireless communication network. The method comprises determining a group communication performance for a group communication mode of the device, determining a single-link communication performance for a single-link communication mode of the device, comparing the group communication performance with the single-link communication performance, and controlling the device to operate in the group communication mode or the single-link communication mode based on the comparison.

In some related embodiments, the group communication performance is defined in relation to a user bit rate at which data can be transferred from the device to a network node using the group communication mode. Moreover, the user bit rate may be defined in relation to a maximum user bit rate that can be achieved by the device when performing group communication through other devices in a corresponding group, and a number of the other devices that are currently active in group communication.

In some related embodiments, the method determines the user bit rate by reading information from a group communication queue, determining a number of devices in a group that are currently active in group communication based on the information, and determining the user bit rate based on the determined number of devices.

In some related embodiments, the group communication performance comprises a user bit rate associated with the group communication mode, the single-link communication performance comprises a user bit rate associated with the single-link communication mode, and the method controls the device according to whether the user bit rate associated with the group communication mode is greater than the user bit rate associated with the single-link communication mode.

BRIEF DESCRIPTION OF THE DRAWINGS

The drawings illustrate selected embodiments of the disclosed subject matter. In the drawings, like reference labels denote like features.

DETAILED DESCRIPTION

The following description presents various embodiments of the disclosed subject matter. These embodiments are presented as teaching examples and are not to be construed as limiting the scope of the disclosed subject matter. For example, certain details of the described embodiments may be modified, omitted, or augmented without departing from the scope of the described subject matter.

In general, the disclosed subject matter provides various techniques and technologies for controlling a communication mode of a device in a wireless communication network. In certain embodiments, for example, a network determines whether it is more efficient for a device such as a UE to communicate in a group communication mode or a single-link communication mode, and then selects to operate the device in the mode that is more efficient. The determination of the more efficient communication mode is typically based on a determination (e.g., calculation, detection, or estimation) of a group communication performance (e.g., corresponding a value or metric) and a single-link communication performance.

The performance determinations are typically performed by the transmitting device itself (e.g., a UE) or by a network node in communication with the transmitting device. The performance values may be defined in relation to user bit rates at which data can be transferred from the device to the network node using the different communication modes. For the group communication mode, for instance, the user bit rate may be determined, at least in part, by SNR values associated with devices in the corresponding group. In certain embodiments, determining the user bit rate comprises determining a maximum user bit rate that can be achieved by the device when performing group communication through other devices in the corresponding group, determining the number of the other devices that are currently active in group communication, and determining the user bit rate based on the maximum user bit rate and the number of the other devices.

The described embodiments may provide various benefits compared to conventional approaches. For example, they may avoid inefficiencies that arise when several devices in a group engage in group communication at the same time. By avoiding such inefficiencies, the described embodiments may potentially improve both uplink (UL) coverage and UL capacity of a network.

The described embodiments may be implemented in any appropriate type of communication system supporting any suitable communication standards and using any suitable components. As one example, certain embodiments may be implemented in an LTE network, such as that illustrated in FIG. 2.

Figure 2:
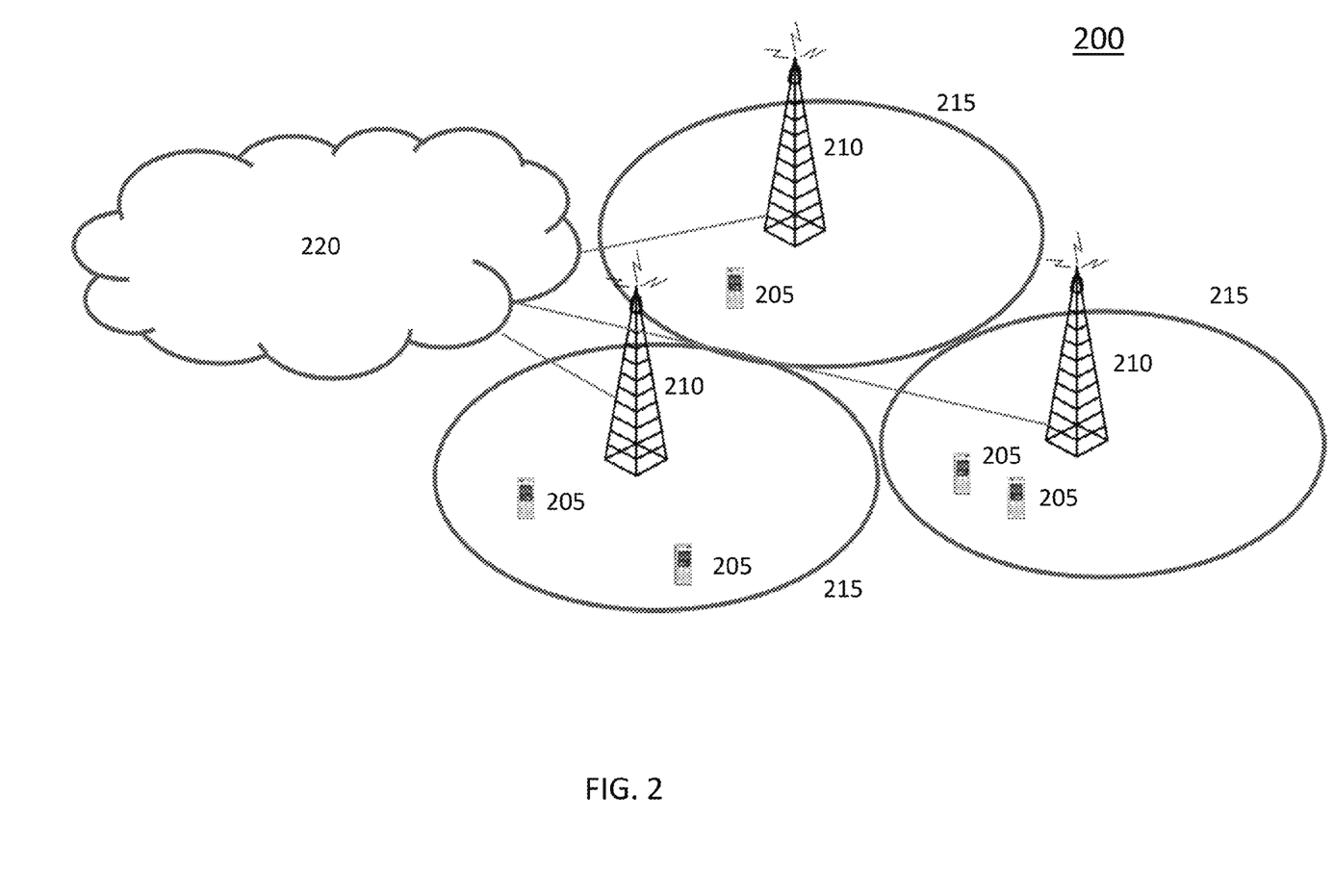
FIG. 2 is a diagram illustrating an LTE network.

Referring to FIG. 2, a communication network 200 comprises a plurality of wireless communication devices 205 (e.g., conventional UEs, machine type communication (MTC)/machine-to-machine (M2M) UEs) and a plurality of radio access nodes 210 (e.g., eNodeBs or other base stations). Communication network 200 is organized into cells 215, which are connected to a core network 220 via corresponding to radio access nodes 210. Radio access nodes 210 are capable of communicating with wireless communication devices 205 along with any additional elements suitable to support communication between wireless communication devices or between a wireless communication device and another communication device (such as a landline telephone).

Figure 3:
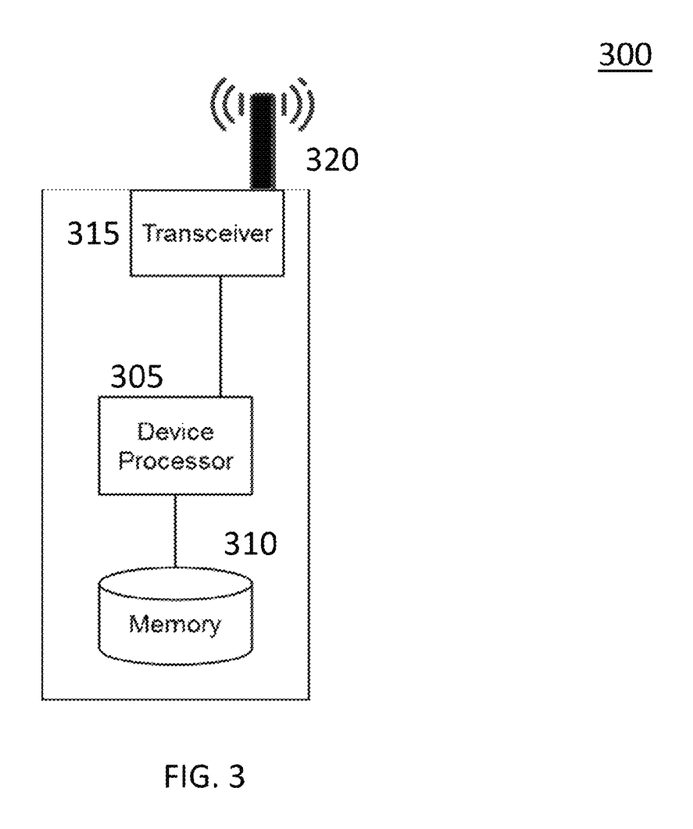
FIG. 3 is a diagram illustrating a wireless communication device.

Although wireless communication devices 205 may represent communication devices that include any suitable combination of hardware and/or software, these wireless communication devices may, in certain embodiments, represent devices such as an example wireless communication device illustrated in greater detail by FIG. 3. Similarly, although the illustrated radio access node may represent network nodes that include any suitable combination of hardware and/or software, these nodes may, in particular embodiments, represent devices such as the example radio access node illustrated in greater detail by FIG. 4.

Referring to FIG. 3, a wireless communication device 300 comprises a processor 305, a memory, a transceiver 315, and an antenna 320. In certain embodiments, some or all of the functionality described as being provided by UEs, MTC or M2M devices, and/or any other types of wireless communication devices may be provided by the device processor executing instructions stored on a computer-readable medium, such as the memory shown in FIG. 3. Alternative embodiments may include additional components beyond those shown in FIG. 3 that may be responsible for providing certain aspects of the device's functionality, including any of the functionality described herein.

Figure 4:
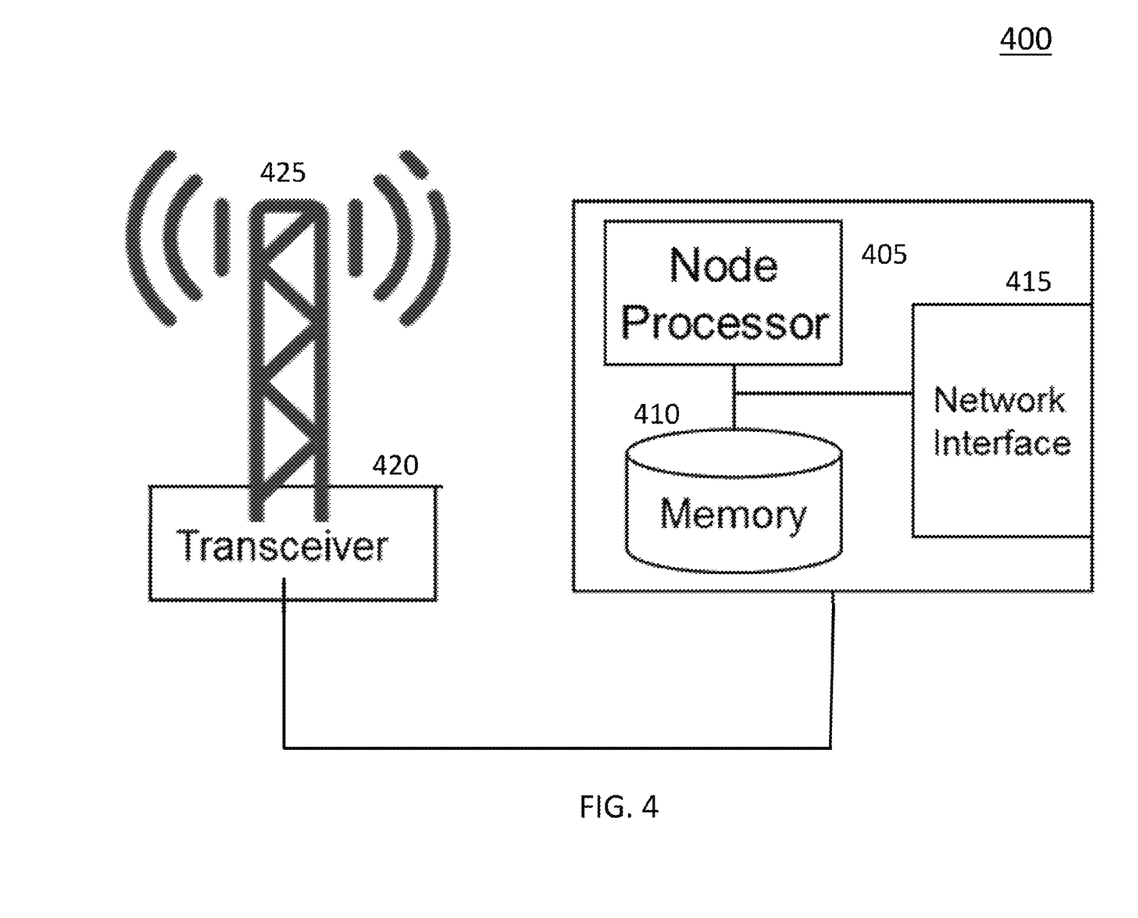
FIG. 4 is a diagram illustrating a radio access node.

Referring to FIG. 4, a radio access node 400 comprises a node processor 405, a memory 410, a network interface 415, a transceiver 420, and an antenna 425. In certain embodiments, some or all of the functionality described as being provided by a base station, a node B, a eNodeB, and/or any other type of network node may be provided by node processor 405 executing instructions stored on a computer-readable medium, such as memory 410 shown in FIG. 4. Alternative embodiments of radio access node 400 may comprise additional components to provide additional functionality, such as the functionality described herein and/or related supporting functionality.

Figure 5A:
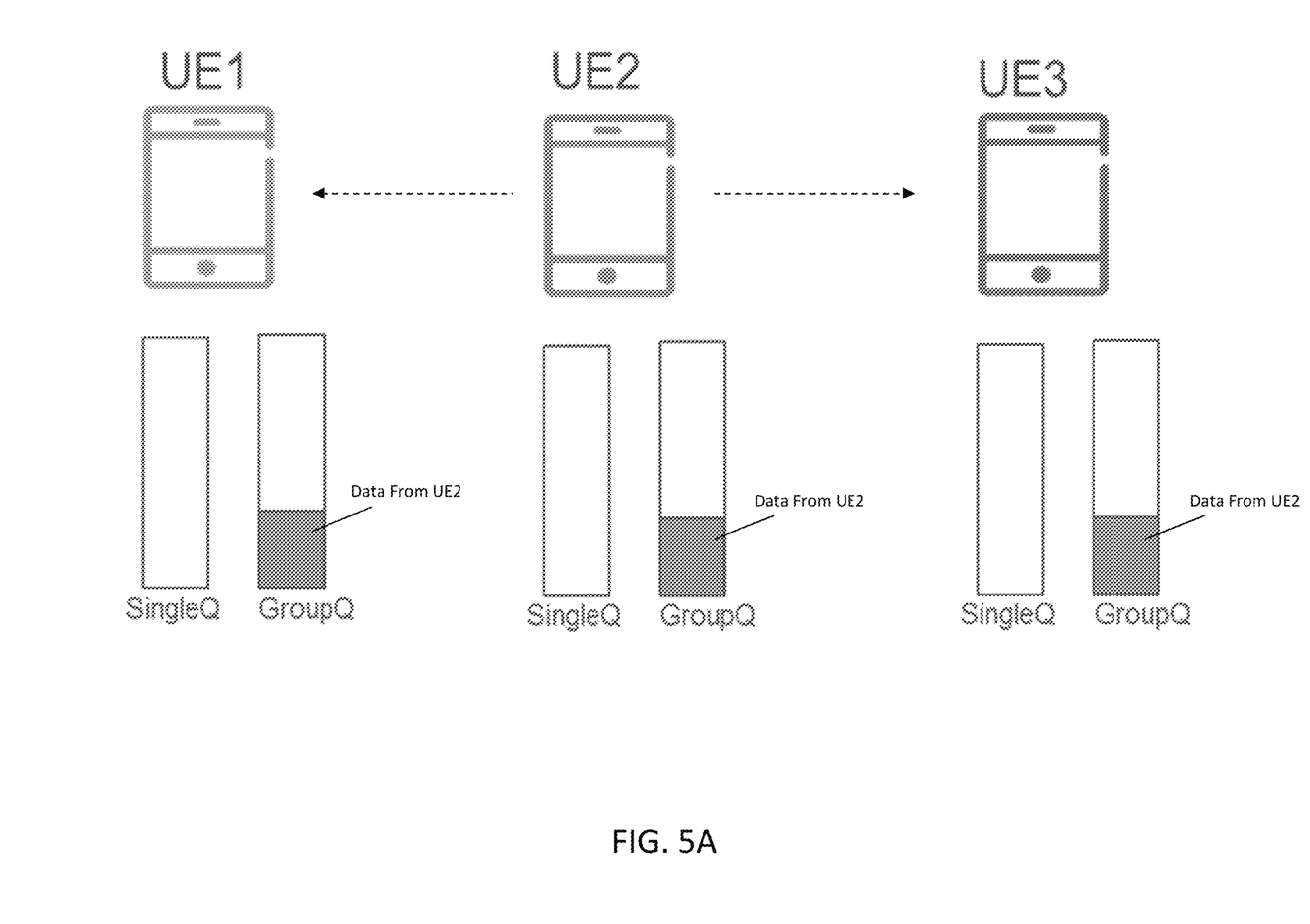
FIG. 5A is a conceptual diagram illustrating single-link communication queues and group communication queues during group communication from one UE in a group including three UEs.
Figure 5B:
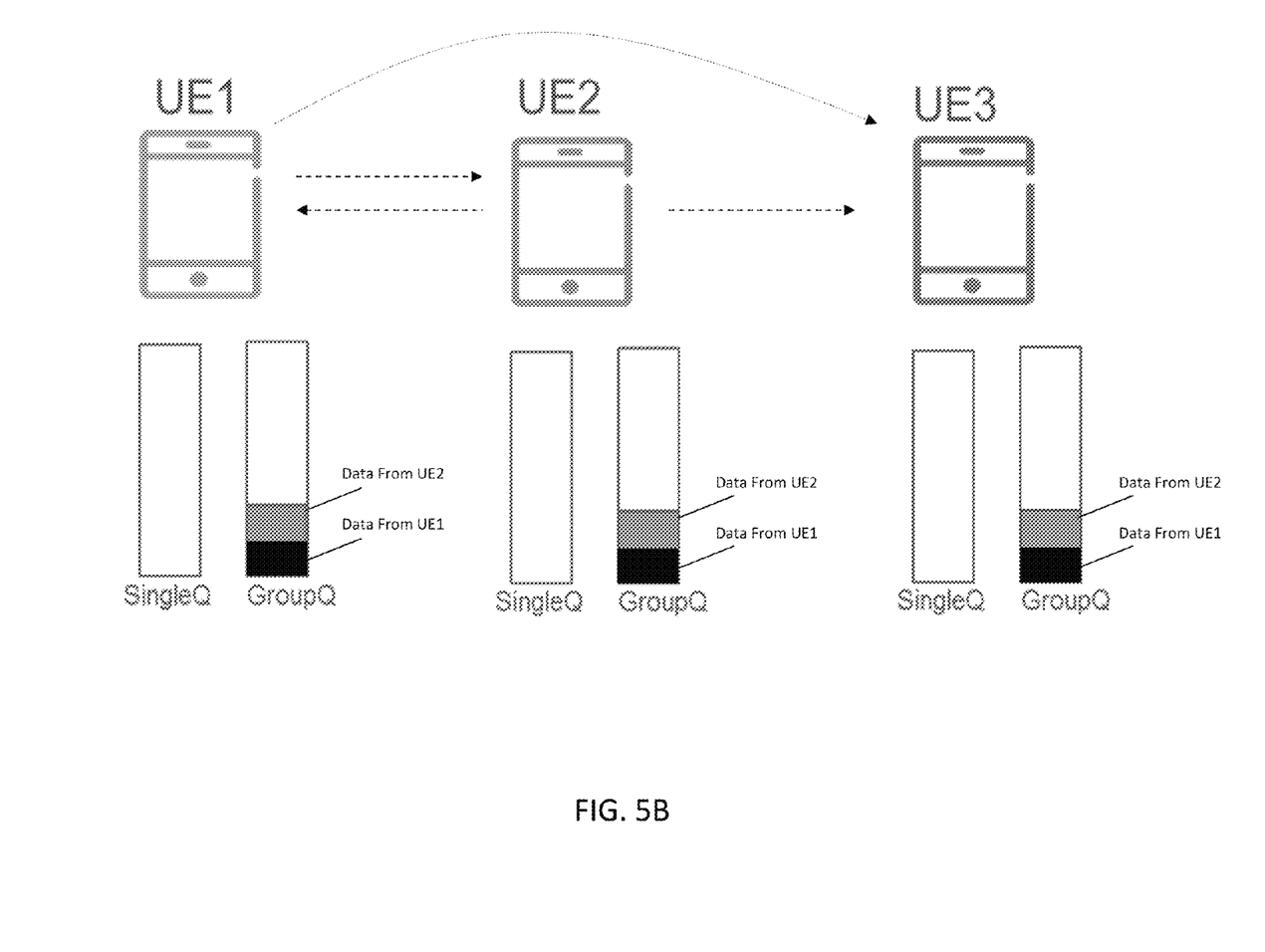
FIG. 5B is a conceptual diagram illustrating single-link communication queues and group communication queues during group communication from two UEs in a group including three UEs.
Figure 5C:
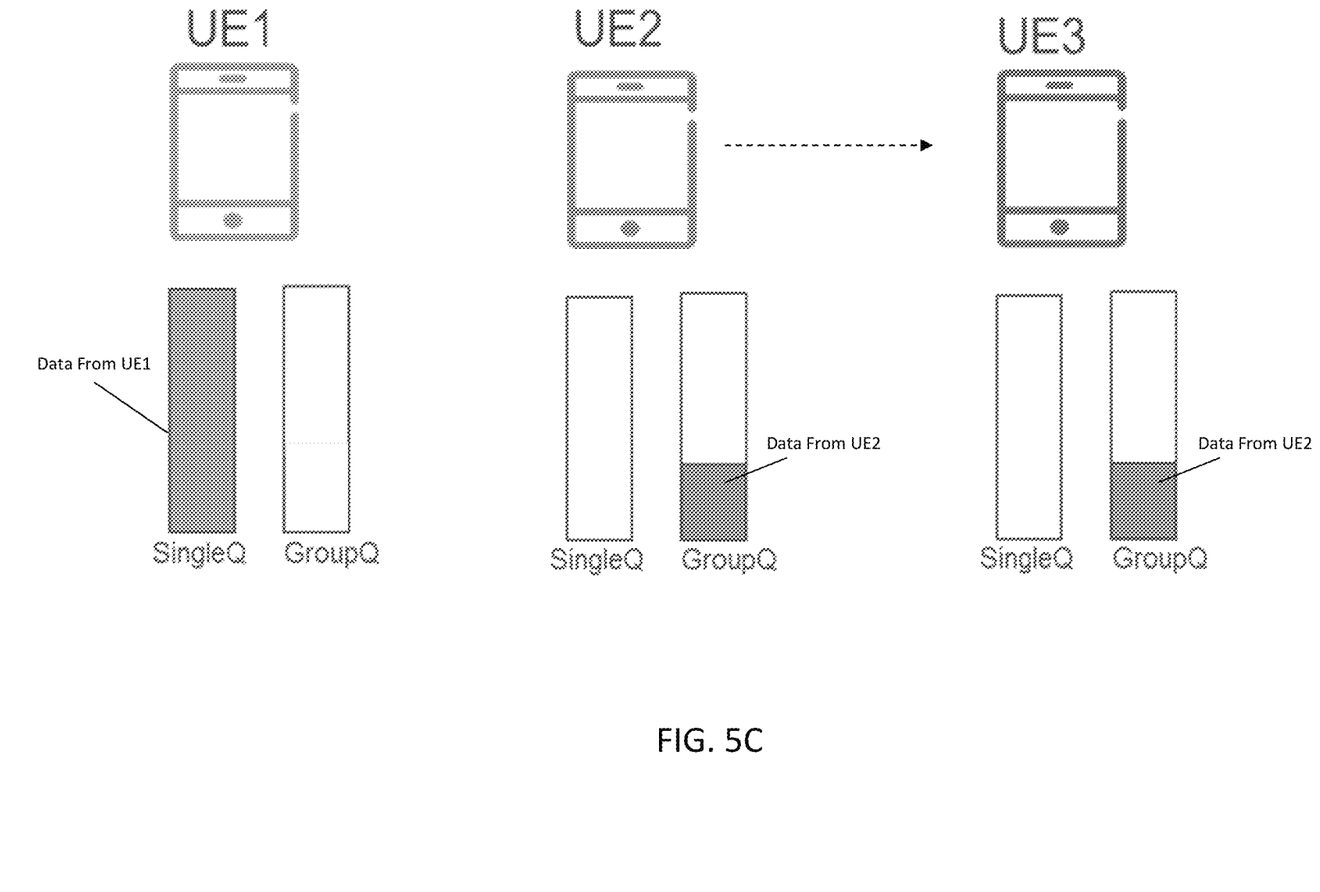
FIG. 5C is a conceptual diagram illustrating single-link communication queues and group communication queues during group communication from one UE in a group including three UEs, and single-link communication from one UE in the same group.

FIGS. 5A through 5C are conceptual diagrams illustrating single-link communication queues and group communication queues during different communication scenarios. The single-link communication queues are used to store data (e.g., payload data, control data, timing data, metadata, etc.) to be transmitted from corresponding UEs operating in single-link communication mode, and the group communication queues are used to store data to be transmitted from corresponding UEs operating in group communication mode. The UEs illustrated in FIGS. 5A through 5C are assumed to operate within a common cell, and they are assumed to be members of a common group employing group communication.

Referring to FIG. 5A, three UEs—UE1, UE2 and UE3—operate in a group communication mode to transmit data from UE2 to a network node. To do so, the same data from UE2 is stored in a group communication queue associated with each of the UEs. The data may be time-stamped in some manner to allow each of the UEs to transmit the data to the network node at the same time.

Referring to FIG. 5B, the three UEs operate in the group communication mode to transmit data from both UE1 and UE2 to the network node. Under these circumstances, the group communication resources must be shared among both UE1 and UE2, which typically means that transmissions from UE1 are time-multiplexed with transmissions from UE2. Under such a time-multiplexing scheme, the proportion of the available transmission time allotted to each UE is referred to as an access time "T". The access time tends to decrease as the number of UEs using group communication increases.

Referring to FIG. 5C, UE1 operates in single-link communication mode while the other UEs—UE2 and UE3—operate in group communication mode. Accordingly, in contrast to FIG. 5A, the data from UE2 is transmitted from only two devices during group communication, or in other words, with less total power.

As illustrated by the examples in FIGS. 5A through 5C, there are various trade-offs between group communication and single-link communication, and those trade-offs may change according to the operating conditions of the group. For example, under the conditions in FIG. 5A, UE2 may transmit data in a timely and robust manner through the use of group communication. Under the conditions in FIG. 5B, the timing efficiency of group communication decreases, and under the conditions in FIG. 5C, the overall transmission power of group communication decreases. Under some circumstances, the potential benefits of group communication may be so diminished and/or outweighed by other factors, that it may be desirable to transmit data using single-link communication instead. Accordingly, in certain embodiments described below, a device or network determines (e.g., computes, estimates, or detects) whether it is more efficient to transmit data using single-link communication or group communication, and then selects a communication mode based on the determination.

Figure 6:
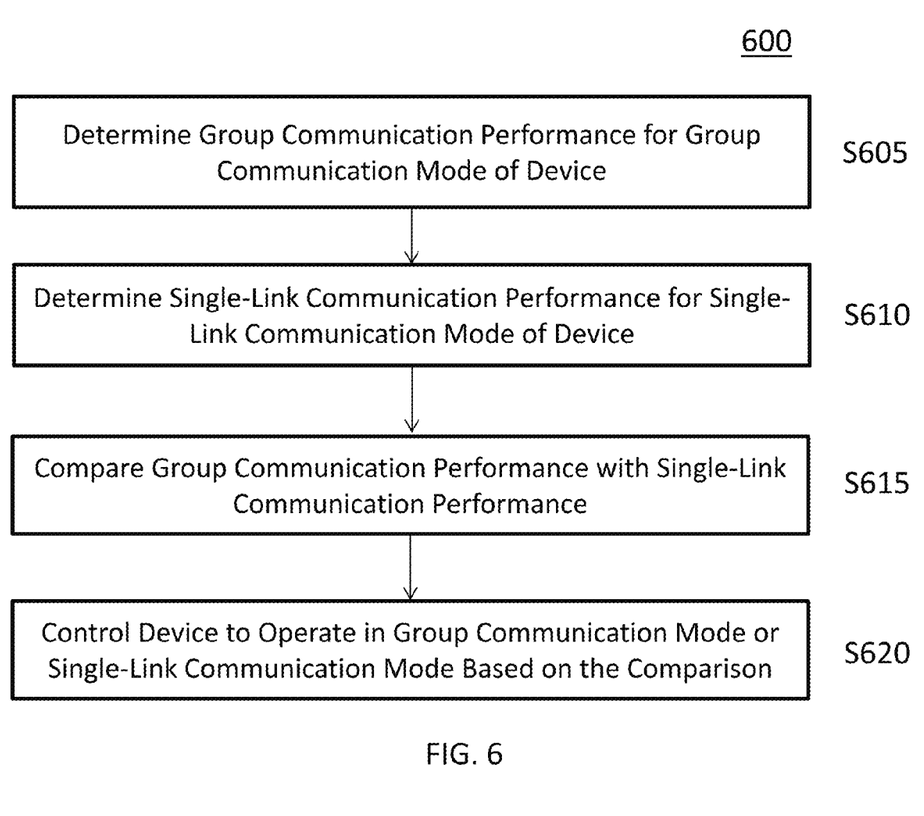
FIG. 6 is a flowchart illustrating a method of controlling a communication mode of a device in a wireless communication network.

FIG. 6 is a flowchart illustrating a method 600 of controlling a communication mode of a device in a wireless communication network.

Referring to FIG. 6, the method comprises determining a group communication performance for a group communication mode of the device (S605), determining a single-link communication performance for a single-link communication mode of the device (S610), comparing the group communication performance with the single-link communication performance (S615), and controlling the device to operate in the group communication mode or the single-link communication mode based on the comparison (S620). These operations may be performed by the device itself (e.g., a UE) or by a network node such as a radio access node.

Figure 7:
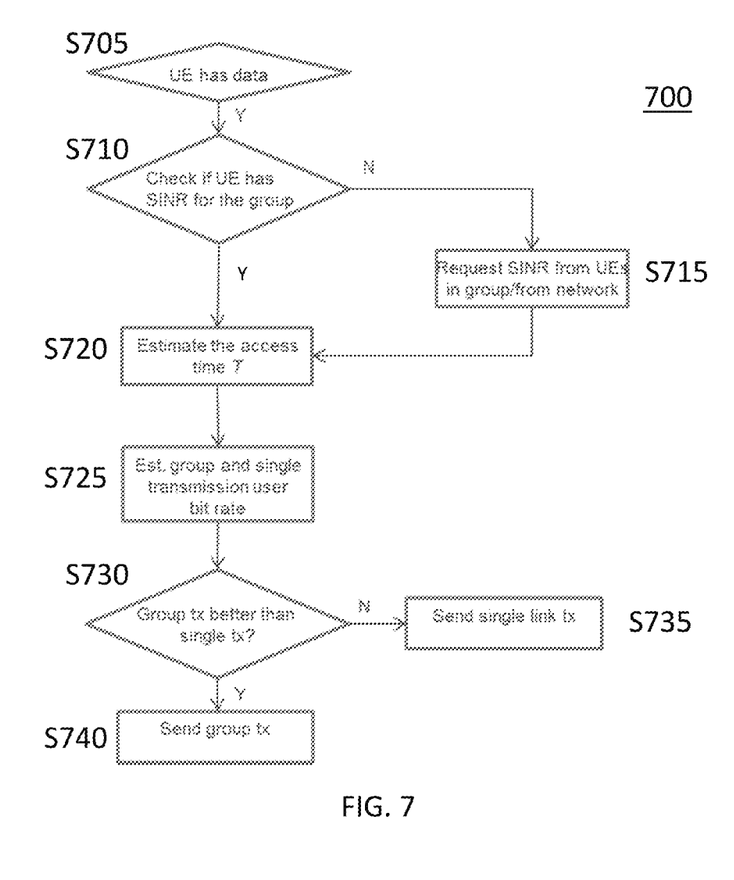
FIG. 7 is another flowchart illustrating a method of controlling a communication mode of a device in a wireless communication network.

FIG. 7 is another flowchart illustrating a method 700 of controlling a communication mode of a device in a wireless communication network. Method 700 of FIG. 7 represents one potential implementation of method 600 illustrated in FIG. 6. In the description of FIG. 7 and certain related concepts, some operations may be described as being performed by a user or a device. For convenience, the terms "user" and "device" in this context will be used interchangeably to refer to an entity that performs the indicated operations, although it will be recognized that in alternative embodiments a single device could correspond to more than one user, or vice versa.

Referring to FIG. 7, a UE first determines whether it has data to be transmitted to a network node (S705). If so (S705=Y), the UE checks whether it has a UL SINR for a group through which it can perform group communication (S710). If the UE does not have the SINR (S710=N), it requests the SINR from other UEs in the network or from the network itself.

In general, the UL SINR for the group may be determined based on UL SINR values associated with each of the UEs in the group. For instance, assuming that D2D links from the UE to all other UEs in the group are more efficient than the user to network links, the SINR value for group transmission, denoted $SINR_{grouptx}$, is obtained by summing SINR values for individual single-link communication by the UEs in the group, denoted $SINR_{singletx}(u)$, according to the following Equation (1).

$$SINR_{grouptx} = \sum_{u}^{GroupSize} SINR_{singletx}(u). \quad (1)$$

A maximum user bit rate the user can achieve for a group transmission, denoted $UBR_{max,grouptx}$, can be calculated according to the following Equation (2).

$$UBR_{max,grouptx} = \log_2(1 + SINR_{grouptx}) \quad (2)$$

If there are more users in the group that currently use group communication, the "new" user must be time multiplexed with the other users, e.g., as shown in FIG. 5B. Therefore each user or device must be aware of which other users or devices are active in the group. This can be done by reading the group queue and calculating the expected time "T" the UE can access the group communication according to the following Equation (3).

$$T = \frac{1}{(1 + CurrentActiveGroupTxUsers)} \quad (3)$$

For example, in FIG. 5A, only UE2 is active in the group queue and thus a new user will get T=1/(1+1)=0.50. The access time is then used to scale the maximum user bit rate according to the following Equation (4).

$$UBR_{grouptx} = T \cdot UBR_{max,grouptx} \quad (4)$$

The $UBR_{grouptx}$ is then compared to a single-link user bit rate $UBR_{singletx}$ according to the following Equation (5).

$$UBR_{singletx} = \log_2(1 + SINR_{singletx}) \quad (5)$$

Then if $UBR_{grouptx} > UBR_{singletx}$, group transmission is selected for this user.

As examples of the above selection process, first consider an extreme case where all users are engaged in group transmission (or single-link transmission and are willing to give T=1/group size of their resources to the group). In this case, $UBR_{grouptx} < UBR_{singletx}$ for all users (unless the specific user has a very low UL $SINR_{singletx}$ or no UL coverage at all), so the single transmission mode will be selected. Second, consider another extreme case where all users are free, the situation is different. Here all T=1 so the $SINR_{grouptx}$ is the sum of the individual $SINR_{singletx}$ and consequently $UBR_{grouptx} > UBR_{singletx}$ and the group transmission mode is optimal.

As will be apparent from the foregoing description, the method of FIG. 6 or FIG. 7 may require a device to acquire information about other devices, such as a gain from the other devices to the network (or SINR), a gain (or SINR) between the other devices (D2D), and activity values $A_u$ for the other devices (e.g., to estimate how much of the UEs resources are free). Such information may be acquired through various alternative forms of signalling, such as in-band proprietary signalling or standardized control signalling. Performance estimation (e.g., with respect to group communication performance and single-link communication performance) can be done by UEs (assuming the UEs receive necessary information) or it can be estimated by the network and the performance is signalled to each UE.

Where a user in a group is using single-link transmission, the user may not participate in group communication initiated by other group members. This means the combined SINR will be reduced. For example, assume UE1 is occupied with single-link transmission and at the same time UE2 wants to perform a group transmission (e.g., as in FIG. 5C). Under these circumstances, the group $SINR_{grouptx}$ may be defined by the following Equation (7).

$$SINR_{grouptx} = \sum_{u}^{2,3} SINR_{singletx}(u) \quad (7)$$

If many users in a group use single-link transmission, there is relatively little capacity for a user in the group to actually use the group transmission efficiently (because access time "T" becomes small). One way to avoid this reduced capacity is that a network may adopt a "minimum group usage" parameter (or "maximum single-link transmission usage"). This adoption may force users of single-link transmission to accept group transmission requests from other users in the group. In an extreme case, such a parameter may be set so that only group communication can be used.

Although certain embodiments are described with respect to single-link and group communication with multiplexing in the time domain, these and other embodiments could alternatively use multiplexing in the frequency domain.

In certain embodiments, device-to-device links may use the same LTE spectrum as the cellular link. In this case, more interference may be generated where D2D is used. Therefore, an extra margin can be used to determine or evaluate the performance of group communication. For instance, group communication could be used in the event that the user bit rate for group communication satisfies the inequality in the following Equation (6), in which $U_{margin}$ is an extra margin due to the extra interference because D2D and cellular transmission utilize the same frequency band.

$$UBR_{grouptx} > UBR_{singletx} + U_{margin} \quad (6)$$

Figure 8:
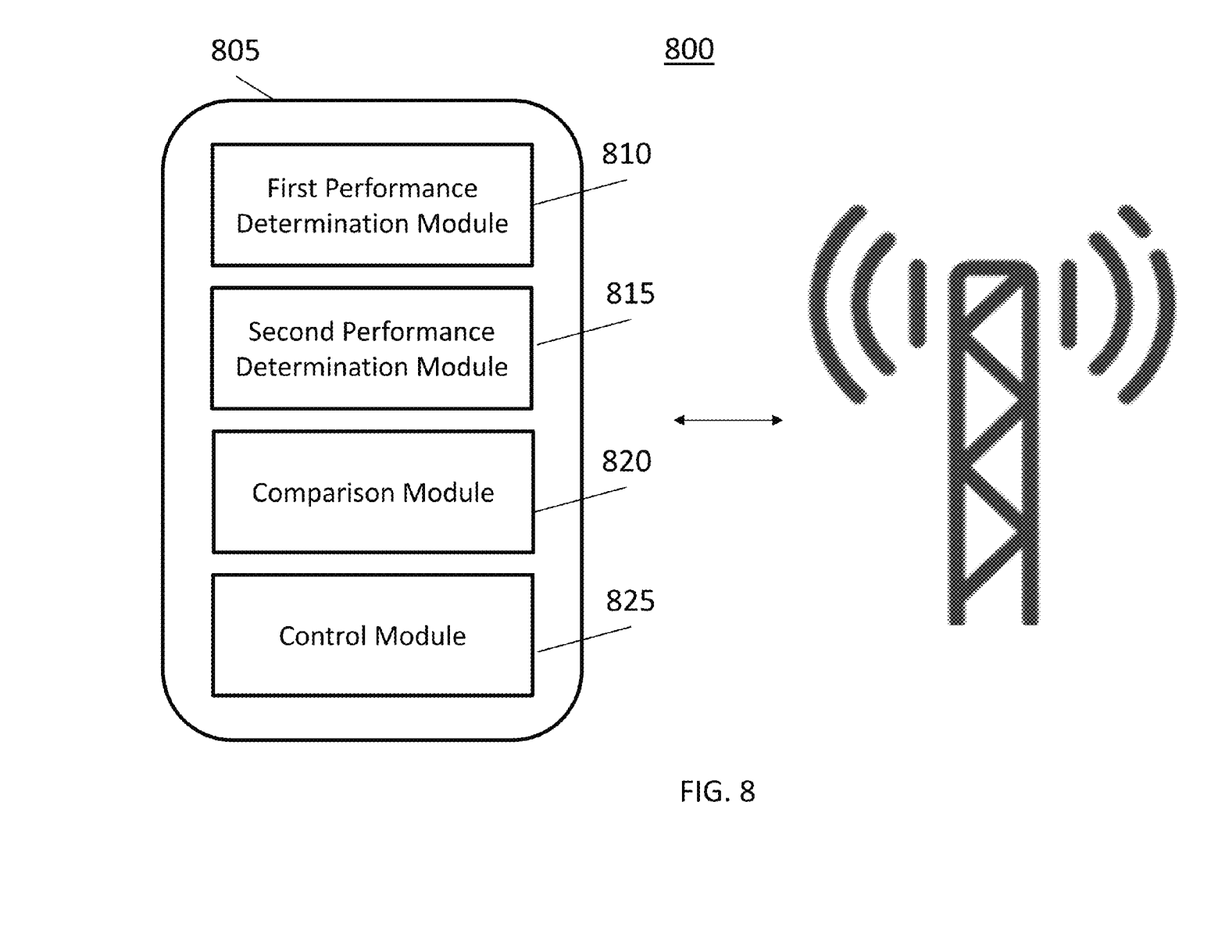
FIG. 8 is a diagram illustrating an apparatus configured to control a communication mode of a device in a wireless communication network.

FIG. 8 is a diagram illustrating an apparatus 805 configured to control a communication mode of a device in a wireless communication network 800.

Referring to FIG. 8, apparatus 805 comprises a first performance determination module 810 configured to determine a group communication performance for a group communication mode of the device, a second performance determination module 815 configured to determine a single-link communication performance for a single-link communication mode of the device, a comparison module 820 configured to compare the group communication performance with the single-link communication performance, and a control module 825 configured to control the device to operate in the group communication mode or the single-link communication mode based on the comparison. In this context, the term "module" denotes any combination of hardware and/or software capable of performing a designated function. Such hardware and/or software may comprise, for instance, one or more processors, memories, and executable instructions capable of performing the designated function. One example of such hardware is illustrated in FIG. 3.

While the disclosed subject matter has been presented above with reference to various embodiments, it will be understood that various changes in form and details may be made to the described embodiments without departing from the scope of the invention as defined by the claims.

The invention claimed is:

1. A method of controlling a communication mode of a device in a wireless communication network, comprising:
   determining a group communication performance for a group communication mode of the device, wherein the group communication performance comprises a user bit rate associated with the group communication mode;
   determining a single-link communication performance for a single-link communication mode of the device, wherein the single-link communication performance comprises a user bit rate associated with the single-link communication mode;
   comparing the group communication performance with the single-link communication performance, wherein comparing the group communication performance with the single-link communication performance comprises determining whether the user bit rate associated with the group communication mode is greater than the user bit rate associated with the single-link communication mode; and controlling the device to operate in the group communication mode or the single-link communication mode based on the comparison, comprising controlling the device to operate in the group communication mode as a consequence of determining that the user bit rate associated with the group communication mode is greater than the user bit rate associated with the single-link communication mode.

2. The method of claim 1, wherein the device comprises user equipment (UE), and the method is performed by a network node in the wireless communication network.

3. The method of claim 1, wherein the device comprises user equipment (UE) in the wireless communication network, and the method is performed by the UE.

4. The method of claim 1, wherein determining the group communication performance comprises determining a user bit rate at which data can be transferred from the device to a network node using the group communication mode.

5. The method of claim 4, wherein determining the user bit rate comprises:
 determining a maximum user bit rate that can be achieved by the device when performing group communication to transmit information using the radio links to the network node provided by other devices in a corresponding group;
 determining a number of the other devices that are currently active in group communication; and
 determining the user bit rate based on the maximum user bit rate and the number of the other devices in the corresponding group.

6. The method of claim 5, wherein determining the maximum user bit rate comprises determining a sum of respective gain values for devices in the corresponding group, the sum reflecting the quality of a radio connection between the device and the network node, and applying a function to the determined sum to produce an estimate of the maximum bit rate.

7. The method of claim 6, wherein the function is a log function.

8. The method of claim 6, wherein the function is a look-up-table function.

9. The method of claim 6, wherein the respective gain values are signal to interference plus noise ratio (SINR) values.

10. The method of claim 4, wherein determining the user bit rate comprises reading information from a group communication queue, determining a number of devices in a group that are currently active in group communication based on the information, and determining the user bit rate based on the determined number of devices.

11. The method of claim 1, wherein determining the single-link communication performance comprises determining a user bit rate at which data can be transferred from the device to a network node using the single-link communication mode.

12. The method of claim 1, further comprising receiving information exchanged between devices in a group designated to jointly use the group communication mode, and determining the group communication performance based on the received information.

13. The method of claim 12, wherein the received information comprises a gain from the devices to a network node, which reflects the channel quality of a radio link between the device and network node.

14. The method of claim 12, wherein the received information comprises an activity value indicating availability of device resources for group communication.

15. The method of claim 14, wherein the activity value indicates whether one or more devices in the group are currently operating in single-link communication mode.

16. The method of claim 14, wherein the activity value indicates an expected time that each of multiple devices in the group is to use group communication.

17. The method of claim 1, further comprising defining a minimum group communication usage or maximum single-link communication usage, and controlling each of multiple devices in a group jointly using the group communication mode to perform group communication or single-link communication in accordance with the defined minimum group communication usage or maximum single-link communication usage.

18. The method of claim 1, wherein the group communication performance comprises a user bit rate associated with the group communication mode, the single-link communication performance comprises a user bit rate associated with the single-link communication mode, and comparing the group communication performance with the single-link communication performance comprises determining whether the user bit rate associated with the group communication mode is greater than the user bit rate associated with the single-link communication mode plus a margin if the communication between the devices and the group communication to the network use same frequency.

19. An apparatus configured to control a communication mode of a device in a wireless communication network, comprising:
 at least one processor configured to:
 determine a group communication performance for a group communication mode of the device, wherein the group communication performance is defined in relation to a user bit rate at which data can be transferred from the device to a network node using the group communication mode, wherein the user bit rate is defined in relation to a maximum user bit rate that can be achieved by the device when performing group communication through other devices in a corresponding group, and a number of the other devices that are currently active in group communication, and wherein the maximum user bit rate is defined in relation to a sum of respective gain values for devices in the corresponding group;
 determine a single-link communication performance for a single-link communication mode of the device;
 compare the group communication performance with the single-link communication performance; and
 control the device to operate in the group communication mode or the single-link communication mode based on the comparison.

20. The apparatus of claim 19, wherein the at least one processor resides in a network node of the wireless communication network.

21. The apparatus of claim 19, wherein the at least one processor resides in user equipment (UE) of the wireless communication network.

22. The apparatus of claim 19, wherein the respective gain values are signal to interference plus noise ratio (SINR) values.

23. The apparatus of claim 19, wherein the at least one processor is further configured to determine the user bit rate by reading information from a group communication queue, determine a number of devices in a group that are currently active in group communication based on the information, and determine the user bit rate based on the determined number of devices.

24. The apparatus of claim 19, wherein the group communication performance comprises a user bit rate associated with the group communication mode, the single-link communication performance comprises a user bit rate associated with the single-link communication mode, and the at least one processor is configured to determine whether the user bit rate associated with the group communication mode is greater than the user bit rate associated with the single-link communication mode.

25. The apparatus of claim 19, wherein the at least one processor is still further configured to receive information transmitted from devices in a group designated to jointly use the group communication mode, and to determine the group communication performance based on the received information.

26. The apparatus of claim 25, wherein the received information comprises a gain from the devices to a network node, a gain between the devices in the group, or an activity value indicating availability of device resources for group communication.

27. A non-transitory computer readable medium storing instructions for performing a method of controlling a communication mode of a device in a wireless communication network, wherein the method comprises:
    determining a group communication performance for a group communication mode of the device;
    determining a single-link communication performance for a single-link communication mode of the device;
    comparing the group communication performance with the single-link communication performance; and
    controlling the device to operate in the group communication mode or the single-link communication mode based on the comparison;
    wherein the group communication performance is defined in relation to a user bit rate at which data can be transferred from the device to a network node using the group communication mode, and wherein the user bit rate is defined in relation to a maximum user bit rate that can be achieved by the device when performing group communication through other devices in a corresponding group, and a number of the other devices that are currently active in group communication.

28. The non-transitory computer readable medium of claim 27, wherein the method determines the user bit rate by reading information from a group communication queue, determining a number of devices in a group that are currently active in group communication based on the information, and determining the user bit rate based on the determined number of devices.

29. The non-transitory computer readable medium of claim 27, wherein the group communication performance comprises a user bit rate associated with the group communication mode, the single-link communication performance comprises a user bit rate associated with the single-link communication mode, and the method controls the device according to whether the user bit rate associated with the group communication mode is greater than the user bit rate associated with the single-link communication mode.

30. A method of controlling a communication mode of a device in a wireless communication network, comprising:
    determining a group communication performance for a group communication mode of the device;
    determining a single-link communication performance for a single-link communication mode of the device;
    comparing the group communication performance with the single-link communication performance;
    controlling the device to operate in the group communication mode or the single-link communication mode based on the comparison; and
    receiving information exchanged between devices in a group designated to jointly use the group communication mode, and determining the group communication performance based on the received information, wherein the received information comprises a gain from the devices to a network node, which reflects the channel quality of a radio link between the device and network node or an activity value indicating availability of device resources for group communication.

31. The method of claim 30, wherein the activity value indicates whether one or more devices in the group are currently operating in single-link communication mode.

32. The method of claim 30, wherein the activity value indicates an expected time that each of multiple devices in the group is to use group communication.

* * * * *